United States Patent Office 3,455,587
Patented July 15, 1969

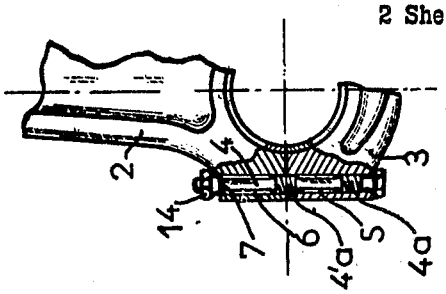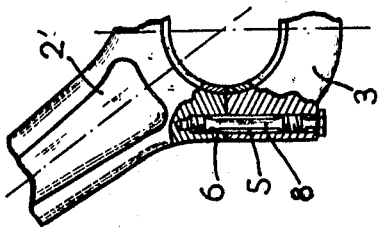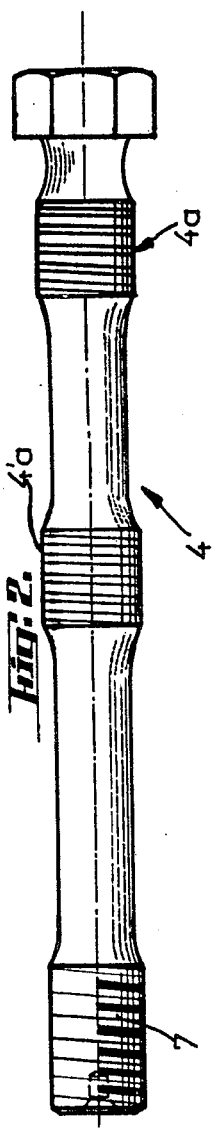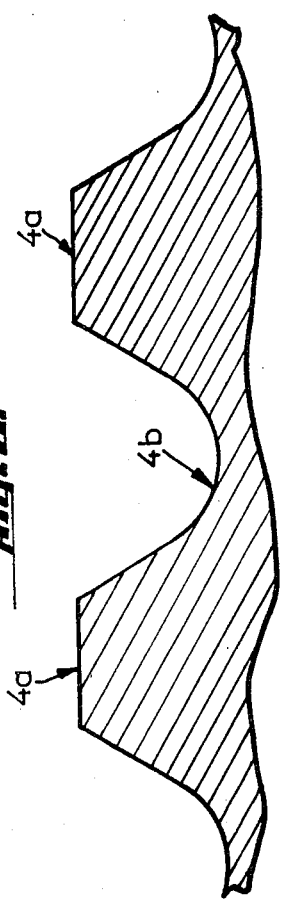

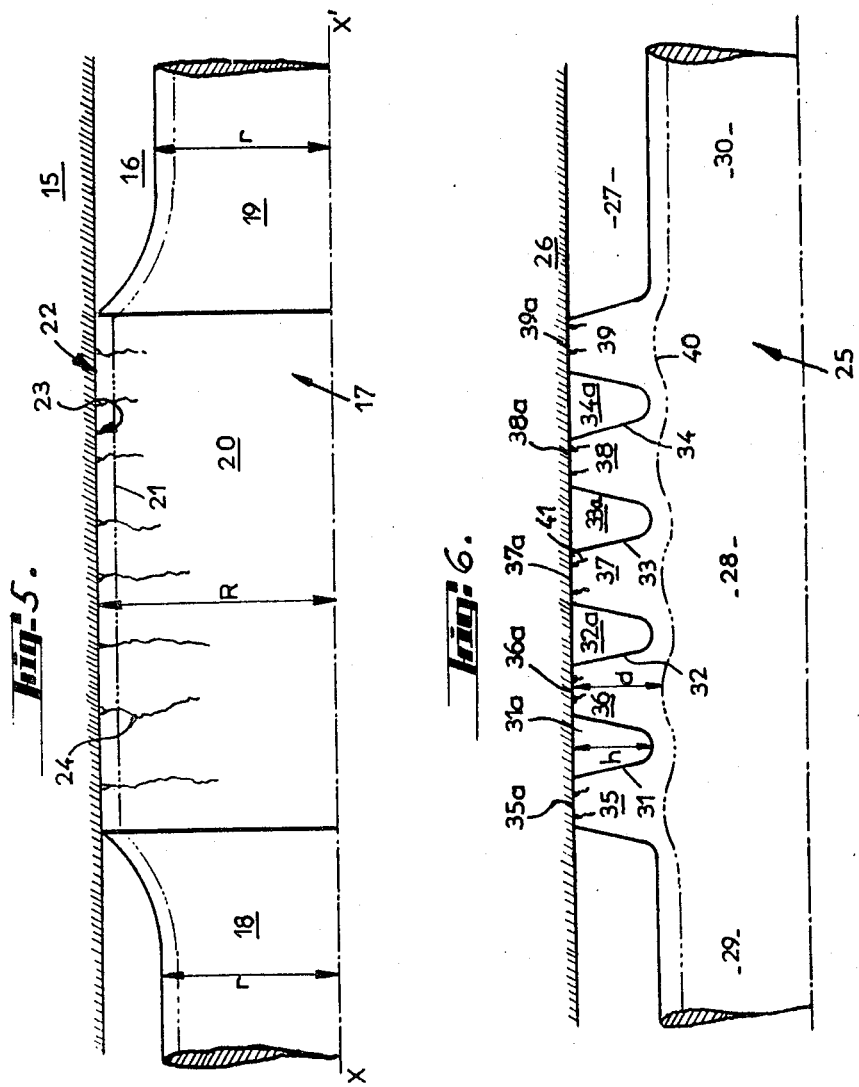

3,455,587
ANTIFRETTING ASSEMBLY
Jacques Gallois, Paris, France, assignor to Societe d'Etudes de Machines Thermiques, Saint-Denis, Seine-Saint-Denis, France, a company of France
Continuation-in-part of application Ser. No. 505,643, Oct. 29, 1965. This application Apr. 2, 1968, Ser. No. 718,185
Claims priority, application France, Nov. 13, 1964, Patent 1,422,358
Int. Cl. F16b 1/00, 3/00, 7/00
U.S. Cl. 287—189.36                     6 Claims

ABSTRACT OF THE DISCLOSURE

An assembly subject to service vibrations, comprising a member provided with a cylindrical bore and one element force-fitted or exactly fitted therein, wherein the fretting effect between the contacting surfaces of the member and the element is prevented by means of stress lines removing circular grooves provided on the bearing surface of the element. The grooves are lying in planes at right angles to the element axis.

---

This is a continuation-in-part of the application Ser. No. 505,643, filed on Oct. 29, 1965, now abandoned.

This invention relates to an anti-fretting assembly comprising at least one member provided with a cylindrical bore and one element inserted in said bore, said element having at least one shank portion of a smaller diameter than the diameter of said bore and at least one bearing portion of substantially the same diameter as said bore and engaging the wall of said bore with at least an exact fit.

It is known that the wear observed in the snug fitting of connecting members, which wear was for a long time ascribed to corrosion, is actually due mostly to fretting, which is a phenomenon similar to friction. This phenomenon is sometimes referred to as a "molecular interfacial destruction or contact corrosion." In the present disclosure the term "fretting" considered as more descriptive is used.

To briefly summarize this phenomenon it may be said that in any relative fitting of parts subjected to vibration the contacting surfaces of these parts tend to move in relation to each other due mainly to the inherent vibration of each part which is caused more particularly by the inherent different resonance frequencies of each part, these frequencies depending on the shape and mass of the parts involved.

Under these conditions, if the contacting parts are not sufficiently clamped or tightened to each other, a frictional motion of a very low amplitude but high frequency takes place which is capable of causing very considerable local overheating promoting the formation of micro-welds with consequent surface wear and tear of the assembled parts. Moreover, oxidation or similar phenomena may take place in the thus overheated particles, producing notably hot oxide particles acting like an abrasive and causing serious damages to the registering bearing surfaces of the parts involved. The micro-welds formed at a given moment, are broken a moment after, and as a result the mutual fit between the assembled parts is weakened. Under these conditions, flaws, cracks and the like occur in the parts in mutual contact, which may finally break these parts.

Certain solutions to this problem have already been proposed, aiming at avoiding the sliding of the contacting particles in the fitting assembly. These solutions consist as a rule in lining, by electrolytic deposit for instance, mutually fitting surfaces with metals such as copper, tin, silver, gold and nickel, giving superficial elasticity to the assembled parts. Unfortunately, these solutions are rather costly and constitute only an improvement in a useful life of the parts, without constituting what may be termed a general solution to the problem of fretting.

It is the purpose of this invention to provide an assembly avoiding the inconveniences resulting from fretting with the advantage that such an assembly may be obtained by a very simple and very economical tooling operation.

In a fitting assembly, the high stress lines are distributed in the inserted element along the generatrix of an ideal surface substantially parallel and spaced inwards from the outer lateral surface of the element. When such an assembly is subject to service vibrations, these vibrations producing micro-sliding movements between the points of contact of the wall of the bore and the inserted element, the contacting surfaces between said wall and the bearing portion of said element are subject to incipient cracks extending radially inwards. According to the invention, the bearing portion of the inserted element is provided throughout its length with axially spaced groove means defining hollow portions of substantially U-shaped cross-section and separated from each other by rib means, the radially outward end surface of which is substantially cylindrical and in bearing engagement with said wall, said hollow portions having such a radial depth as to remove said stress surface from said bearing surface and to prevent said incipient cracks from reaching said stress surface.

It will then be understood that the incipient fissures which may occur at the bearing surface of the element cannot cut across these stress lines and therefore cannot spread out.

According to another feature of the invention, said groove means are lying in planes substantially perpendicular to the element axis.

Such an assembly is applicable notably to assemblies comprising fitted or guided bolts, screws and notably to those of the big end of connecting-rods of engines or driving machines.

Practical tests have amply proved the reliability of assemblies according to the invention, with regard to the fretting phenomenon.

This invention is also concerned, by way of novel industrial products, with bolts, studs, tie-rods, or other assembling parts of machines subjected to vibration, and notably in the case of thermal reciprocating engines, such as connecting-rod assembling bolts.

Further objects and advantages of the present invention will be apparent from the following detailed description of the preferred embodiment thereof and with reference to the drawings forming a part of the specification in which:

FIGURE 1 is a diagrammatic elevational view with parts broken away illustrating the big end of a connecting-rod, for example of a Diesel engine, of the type assembled by means of fitted bolts;

FIGURE 2 illustrates on a larger scale an assembling screw of the type utilized in the big end of FIGURE 1, this screw being provided with bearing surfaces made in accordance with the teachings of this invention;

FIGURE 3 illustrates on a larger scale a typical configuration of the helical groove formed along the bearing surface of the screw of FIGURE 2 according to the present invention;

FIGURE 4 is a fragmentary view with parts broken away illustrating an oblique connecting-rod big-end assembled by means of screws;

FIGURE 5 is a schematic longitudinal half section view showing the location of the stress lines in a conventional fitting assembly; and FIGURE 6 is a similar view showing the location of the stress-lines in a fitting assembly according to the invention.

According to the form of embodiment illustrated in the drawing there is shown diagrammatically in FIGURE 1 a big end 1 of a connecting-rod comprising essentially the end portion of the connecting-rod 2 and the cap 3 fitting on said big end. The parts 2 and 3 are assembled by means of fitted bolts 4 extending through corresponding holes 5 and 6 formed in said cap 3 and big end 2, the assembly being tightened by means of nuts 14.

In this assembly the fitted portion subjected to the aforesaid fretting effect consists for example of two guided or fitted bearing surfaces of bolts 4 which extend through said orifices 5 and 6, the screw-threaded end 7 of screw 4 being free of this fretting effect.

According to this invention, this detrimental phenomenon can be avoided by simply providing as shown in detail in FIGURE 2, a bearing surface 4a on bolt 4 which engages said orifice 6 and a bearing surface 4'a bearing simultaneously in orifices 5 and 6, these two bearing surfaces comprising recesses consisting in this example of helical threads having rounded thread bottoms 4b, the shape of these threads being clearly shown in FIGURE 3.

The simple fact of providing these recesses on each bearing surface of the screws 4 is sufficient to reduce considerably the detrimental effect of fretting on these screws.

In the example illustrated the thread bottoms are rounded. The purpose of this round contour is to reduce the notch effect or the local concentration of stress in the thread bottoms. Moreover, these threads may conveniently be machined by using the same machine or the same tools as those required for forming the screw-threads proper.

FIGURE 4 illustrates a typical example of the assembling of an oblique connecting-rod big end by means of screws 8 in lieu of bolts, in case these cannot be used due to the rod inclination in relation to the big end. In this case these screws would comprise at least one guide bearing surface located under the screw head and exposed to the fretting effect. Under these conditions, a bearing surface such as 4a comprising circular or helical grooves is provided which engages the inner surface of the corresponding orifice 5 formed in the cap 3.

The best results are obtained by the aforesaid recesses throughout the length of the bearing surface of at least one of the component elements of the fitting.

FIGURE 5 illustrates schematically a conventional assembly comprising a member 15 with a cylindrical bore 16 and an element 17 inserted in bore 16. The element 17 includes shank portions 18 and 19 of a radius $r$ smaller than the radius $R$ of bore 16 and a smooth bearing portion 20 having a radius substantially equal to $R$. The bearing portion 20 being in fitting engagement by its surface 22 with the surface 23 of the wall of bore 16, the stresses generated in the element 17 are distributed along lines, such as dotted line 21, which extend close to the outer lateral surface 22 on the element 17.

Otherwise, it has been proved that, whatever the delicacy of the tooling of surfaces 22 and 23 may be, the surfaces are mutually contacting by a number of discrete points only. If then, for a very short time, due to even very weak service vibrations, a sliding movement occurs ranging about $10^{-5}$ mm. for instance, the friction will generate at a point of contact and under the pressure effect, a great rise in temperature which may cause the welding of two particles and, after a certain number of cycles, an incipient crack of fissure such as shown in 24.

When such cracks, which extend substantially radially inwards in the element 17, are cutting across stress line 21, they promptly develop, spreading out deeply within the element 17.

FIGURE 6 shows a form of embodiment according to the invention, wherein a fitting assembly includes a member 26 with a cylindrical bore 27 and an element 25 with a bearing portion 28 comprised between two shank portions 29, 30. The bearing portion 28 is provided throughout its length with axially spaced circular grooves 31, 32, 33, 34 of U-shaped cross-section defining hollow portions 31a, 32a, 33a, 34a remaining free in the inserted condition and separated from each other, by rib means 35, 36, 37, 38, 39, the outward end surfaces 35a, 36a, 37a, 38a, 39a of which are substantially cylindrical, i.e. rectilinear in cross-section. In the element 25, the stress lines (such as dotted line 40) cannot follow a sinuous path close to the outer surface of element 25 and remain spaced from the contacting surfaces 35a, 36a, 37a, 38a, 39a by a distance $d$ which is greater than the depth $h$ of the hollow portions 31a, 32a, 33a, 34a. Incipient cracks such as 41 may still occur, but they cannot reach the far removed stress lines such as 40 and consequently cannot spread out.

Of course the number of assembling members is immaterial and one or a plurality of bearing portions such as 28 may be contemplated at will.

Of course, this invention should not be construed as being limited by the specific forms of embodiment shown, described or suggested herein which are given by way of example only.

What is claimed is:

1. An assembly comprising at least two members provided with coaxial cylindrical bores of uniform diameter and one element inserted in said bores joining said members together said element having clamping means at each end thereof and having an elongated shank with at least one annular portion thereon of a smaller diameter than the diameter of said bores and having at least one bearing portion thereon including a bearing surface of substantially the same diameter as said bores, said bearing portion being axially spaced from said smaller diameter portion and engaging the walls of at least one of said bores with at least an exact fit in which the stresses resulting therefrom with said element are distributed along the generatrix of an ideal surface substantially parallel and spaced inwards from the outer lateral surface of said element, the combined axial length of said bores extending beyond both ends of said bearing surface, said assembly being subject to service vibrations producing micro-sliding movements between the points of contact of said walls and said element so that the contacting surfaces between said walls and said bearing portion are subject to incident cracks extending radially inward said element, wherein said bearing portion is provided throughout its length with axially spaced annular groove means defining hollow portions of substantially U-shaped cross-section and separated from each other by rib means the radially outward end surfaces of which define substantially continuous, annular cylindrical surfaces of uniform diameter in bearing engagement with said walls, said hollow portions having such a radial depth as to remove said stress surface from said bearing surface and to prevent said incipient cracks from reaching said stress surface.

2. An assembly according to claim 1, wherein said groove means are lying in planes substantially perpendicular to the element axis.

3. An assembly according to claim 2, wherein the width of said hollow portion is at least equal to the axial length of said rib end surface.

4. An assembly according to claim 3, wherein the bottom of said hollow portion is of semi-circular cross-section.

5. An assembly according to claim 4, wherein said groove means are constituted of circumferential grooves around the element axis.

6. An assembly according to claim 4, wherein said groove means are constituted of one helical groove extending around the axis element.

References Cited

UNITED STATES PATENTS

| | | |
|---|---|---|
| 1,733,643 | 10/1929 | Bot. |
| 2,287,735 | 6/1942 | Halford. |
| 2,912,031 | 11/1959 | Bensinger et al. _ _ _ _ 151—41.73 |
| 3,047,036 | 7/1962 | Waltermire _ _ _ _ _ _ _ _ 151—41.73 |
| 3,125,146 | 3/1964 | Rosan _ _ _ _ _ _ _ _ _ _ _ _ 151—41.73 |

RAMON S. BRITTS, Primary Examiner

U.S. Cl X.R.

74—579; 85—1, 46; 287—129